United States Patent
Krishnamurthy et al.

(10) Patent No.: US 10,645,467 B2
(45) Date of Patent: May 5, 2020

(54) DECONSTRUCTED VIDEO UNITS

(71) Applicant: ADOBE INC., San Jose, CA (US)

(72) Inventors: Balaji Krishnamurthy, Noida (IN);
Sunandini Basu, New Delhi (IN);
Nutan Sawant, Noida (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 14/933,762

(22) Filed: Nov. 5, 2015

(65) Prior Publication Data
US 2017/0134828 A1     May 11, 2017

(51) Int. Cl.
| | |
|---|---|
| *H04N 21/845* | (2011.01) |
| *H04N 21/45* | (2011.01) |
| *H04N 21/472* | (2011.01) |
| *H04N 21/442* | (2011.01) |
| *H04N 21/439* | (2011.01) |
| *H04N 21/44* | (2011.01) |
| *H04N 21/431* | (2011.01) |

(52) U.S. Cl.
CPC ....... *H04N 21/8456* (2013.01); *H04N 21/439* (2013.01); *H04N 21/4314* (2013.01); *H04N 21/44008* (2013.01); *H04N 21/44222* (2013.01); *H04N 21/4532* (2013.01); *H04N 21/47202* (2013.01)

(58) Field of Classification Search
CPC .. H04N 21/442; H04N 21/482; H04N 21/462; H04N 21/8173; H04N 21/854; H04N 21/4131; H04N 21/4335; H04N 21/4314; H04N 21/25875; H04N 21/8456; H04N 21/44008; H04N 21/439; H04N 21/47202; H04N 21/4532; H04N 21/44222
USPC ......... 725/110, 14, 109, 52, 47, 92
See application file for complete search history.

(56) References Cited

U.S. PATENT DOCUMENTS

| | | | |
|---|---|---|---|
| 2002/0120934 A1* | 8/2002 | Abrahams | G06Q 30/06 725/60 |
| 2004/0170392 A1* | 9/2004 | Lu | G06F 17/30787 386/240 |

(Continued)

OTHER PUBLICATIONS

Ali, S., Nishino, K., Manocha, D., & Shah, M. (2013). Modeling, simulation and visual analysis of crowds: a multidisciplinary perspective. In Modeling, Simulation and Visual Analysis of Crowds (pp. 1-19). Springer New York.

(Continued)

*Primary Examiner* — Kunal Langhnoja
(74) *Attorney, Agent, or Firm* — Shook, Hardy & Bacon, L.L.P.

(57) ABSTRACT

Embodiments of the present invention provide systems, methods, and computer storage media directed to navigation of a digital video. In one embodiment, a method may begin by partitioning a digital video into a number of sub-stories based at least in part on transition points identified within the digital video. The plurality of sub-stories can then be grouped into video segments based on the content of each sub-story. These video segments can then be packaged into a navigation panel in accordance with a selected template that defines a layout for the navigation panel. Such a navigation panel can present the video segments to a viewer in an interactive graphical manner that enables the viewer to navigate the one or more video segments. Other embodiments may be described and/or claimed.

20 Claims, 6 Drawing Sheets

(56) References Cited

U.S. PATENT DOCUMENTS

| | | | | |
|---|---|---|---|---|
| 2007/0212023 | A1* | 9/2007 | Whillock | G11B 27/28 386/281 |
| 2008/0059282 | A1* | 3/2008 | Vallier | G06Q 30/0229 705/14.3 |
| 2009/0052870 | A1* | 2/2009 | Marsh | H04N 7/17318 386/292 |
| 2009/0178089 | A1* | 7/2009 | Picco | H04N 7/17336 725/87 |
| 2010/0269144 | A1* | 10/2010 | Forsman | H04N 7/17336 725/92 |
| 2011/0093900 | A1* | 4/2011 | Patel | H04N 7/17318 725/54 |
| 2014/0229836 | A1* | 8/2014 | Young | H04N 5/44543 715/721 |
| 2014/0282795 | A1* | 9/2014 | Kummer | H04N 21/238 725/116 |
| 2016/0155001 | A1* | 6/2016 | Betley | H04N 21/8549 725/116 |

OTHER PUBLICATIONS

Endres, I., & Hoiem, D. (2014). Category-independent object proposals with diverse ranking. IEEE transactions on pattern analysis and machine intelligence, 36(2), 222-234.

Szegedy, C., Liu, W., Jia, Y., Sermanet, P., Reed, S., Anguelov, D., . . . & Rabinovich, A. (2015). Going deeper with convolutions. In Proceedings of the IEEE conference on computer vision and pattern recognition (pp. 1-9).

\* cited by examiner

DECONSTRUCTED VIDEO UNITS

BACKGROUND

Digital videos are continually becoming more and more mainstream on the Internet. In some instances, producers of digital videos are making the digital videos available solely for online streaming. In addition, specialized set-top boxes have been developed to enable users to stream these online digital videos to a conventional television. Yet, even with all of these advancements in the streaming of digital videos, the user interface that is generally utilized to navigate content within a digital video has, for the most part, not seen any technological progress. Traditional user interfaces for streaming online digital videos generally provide for linear control of a video within the playing time of the digital video by offering controls for fast-forwarding, rewinding, pausing, and playing of a digital video. These types of controls have been common since the advent of video cassette recorders that were developed in the 1970s. These types of controls do not provide a viewer with the ability to view just those portions of a digital video that may be most appealing to the viewer and do not provide any mechanism for tracking what portions of the videos are most appealing to the viewer.

SUMMARY

Embodiments of the present invention are directed at systems, methods, and computer storage media for deconstructing a digital video and generating a navigation panel from the deconstructed video to enable a viewer of the digital video to navigate those aspects of the digital video that are most appealing to the user. The navigation panel can present various portions, or segments, of the deconstructed video to a viewer in an interactive graphical manner that enables the viewer to navigate the various portions. To this end, such a method can begin by partitioning a digital video into a number of sub-stories. This partitioning can be based on transition points that have been identified within the digital video that indicate a transition from one sub-story to the next sub-story. These sub-stories can then be grouped into video segments based on content contained within each of the sub-stories. In some embodiments, these video segments can then be packaged into a navigation panel in accordance with a selected template that defines a layout for the navigation panel. Such a navigation panel can present the video segments to a viewer in an interactive graphical manner that enables the viewer to navigate the one or more video segments.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

As mentioned previously, traditional user interfaces for streaming online digital videos do not take advantage of the ability to present digital video content to a viewer in a non-linear manner. While a viewer may be able to manually jump from one location in a digital video to another, there is no way for the viewer to know what portions of the digital video may be most appealing. As such, the viewer may either have to manually advance through the digital video to find these appealing portions, thereby missing much content that could appeal to the viewer and taking up a great deal of the viewer's time, or the viewer could just completely lose interest in the video and stop viewing it entirely. This could be particularly the case when the digital video is a marketing video that the viewer may have no initial interest in viewing.

In addition, these traditional user interfaces do not provide much context to what is contained within the digital video. Currently, a viewer has to start a digital video or read a description of the digital video to enable the user to have an understanding of what is going on within a digital video. For example, with reference to marketing videos, a viewer can be in the dark as to the product or service being offered until the end of the marketing video where the subject product or service may be specifically called out. As such, a viewer may lose interest or be confused as to what the marketing video is directed towards.

Traditional user interfaces also do not provide any mechanism for tracking portions of the digital video that are of interest to the viewer or maintaining statistics in reference to those portions that are most popular with viewers. As such, the producer of the video may know how many views they have, but they cannot tell what specific portions of the video were actually being viewed. As such, the producer has little insight as to what exactly is appealing to: the producer's audience as a whole; specific demographics within that audience; or if there are any differences among the producer's audience. Such insight could be utilized by the producer to increase the appeal of the producer's digital videos.

Embodiments of the present invention are directed at systems, methods, and computer storage media for deconstructing a digital video and generating a navigation panel from the deconstructed video to enable a viewer of the digital video to navigate those aspects of a digital video that are most appealing to the user. In various embodiments, such a process can begin by partitioning a digital video into a number of sub-stories. This partitioning can be based on transition points identified within the digital video that indicate a transition from one sub-story to the next sub-story. These transition points can be identified automatically (e.g., utilizing a set of rules developed through machine learning), manually (e.g., user selection of the transitions points), or in a combination thereof.

Once the transition points have been identified, the sub-stories can then be grouped into video segments based on content contained within each of the sub-stories. Content contained within each sub-story can refer to topics within each sub-story, characters within each sub-story, scenery within each sub-story, or any other content contained within each sub-story. In embodiments, at least one of the video segments includes two sub-stories that are grouped consecutively within the video segment that are not consecutive within the digital video. As such, the video segments can enable a viewer to view the content of the digital video in a non-linear fashion.

These video segments can then be packaged into a navigation panel. In some embodiments, this packaging can be based on a template selected by the producer generating the navigation panel. The navigation panel can present images of each of the video segments to enable a viewer to gather more information on the content of the video before the viewer has even begun to watch the individual video segments.

These navigation panels can be delivered to the individual viewers through, for example, an online video delivery system. The viewers can then utilize the navigation panels to select and initiate playback of the individual video segments that are most appealing to the user. The interaction of the user with the navigation panel can be monitored by integrating reporting features into the navigation panel itself or by monitoring resources (e.g., video segments) accessed by the viewer via the navigation panel. These viewer interactions can then be aggregated to give the producer of the navigation panel and/or the digital video, insight into the producer's audience.

Figure 1:
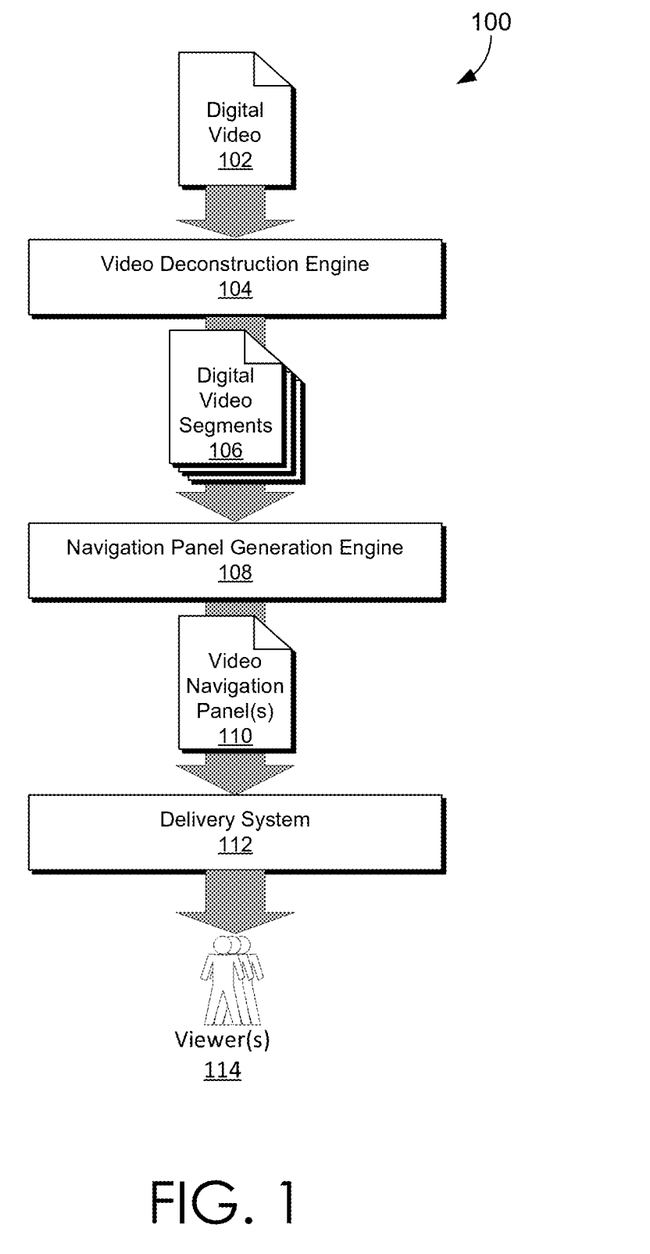
FIG. 1 depicts aspects of an illustrative video processing system in accordance with various embodiments of the present disclosure.

FIG. 1 depicts aspects of an illustrative video processing system 100 in accordance with various embodiments of the present disclosure. Video processing system 100 includes a video deconstruction engine 104, a navigation panel generation engine 108, and a video delivery system 112.

As depicted, video deconstruction engine 104 takes digital video 102 as input. Digital video 102 represents a video that is stored in a digital format. Such a digital format could be, for example, an Audio Video Interleave (AVI) format, a QuickTime File (MOV) format, a Windows Media Video (WMV) format, any of the Moving Picture Expert Group (MPEG) formats, or any other suitable format. In some embodiments, digital video 102 can be produced, or captured, by a video capture device, such as, for example, a video camera; produced entirely in a digital realm, such as, for example, Computer Generated Imagery (CGI); or produced in any combination thereof.

Digital video 102 can include multiple sub-stories. As used herein, a sub-story of a digital video can refer to any contiguous portion of a digital video that has some logical delineation from another contiguous portion of the digital video. These portions can be delineated by, for example, scenes within the digital video, topics within the digital video, characters within the digital video, scenery within the digital video, or any other logical delineation. For example, a portion of a digital video that occurs within the setting of a car could be considered one sub-story, while a portion of the digital video that occurs within an office could be considered another sub-story. As an additional example, and as depicted within FIG. 3, a portion of a digital video that includes a grouping of astronauts could be one sub-story, while a portion of a digital video that includes a rocket launch could be considered another sub-story.

Video deconstruction engine 104 is generally configured to partition, or enable a producer to partition, digital video 102 into these sub-stories. To accomplish this, video deconstruction engine 104 can be configured to identify, or enable a user (e.g., producer or author) of the video deconstruction engine 104 to identify, transition points within digital video 102 that are indicative of a transition from one sub-story to another. This identification of transition points and partitioning of the digital video 102 could be accomplished manually by the user of the video deconstruction engine 104, automatically by the video deconstruction engine 104, or any combination thereof.

In embodiments, where a user of the video deconstruction engine 104 utilizes video deconstruction engine 104 to manually identify the transition points within digital video 102, video deconstruction engine 104 can be configured with a graphical user interface (GUI) that enables a user of video deconstruction engine 104 to identify the transition points that the user wishes to utilize as delineations between sub-stories contained within digital video 102. This could be accomplished, for example, by the user identifying a location, or time, within the digital video 102 that the user wishes to identify as a transition point. The digital video 102 can then be partitioned based on these user identified transition points. In some embodiments, such a GUI could be integrated within video deconstruction engine 102. In other embodiments, such a GUI could be implemented by a video editing system, such as, for example, ADOBE® Premiere (available from Adobe Systems Inc. of San Jose, Calif.). In such embodiments, video deconstruction engine 104 could be implemented as, for example, a plug-in, of such a video editing system that is configured to extend the functionality of the video editing system to provide for deconstruction of a digital video in accordance with this description.

As mentioned previously, in some embodiments, video deconstruction engine 104 can be configured to automatically partition digital video 102 into sub-stories. This automatic partitioning could be accomplished, for example, via machine learning. In such embodiments, video deconstruction engine 104 may be trained to identify transition points utilizing a training set of digital videos. This training can be accomplished, for example, utilizing supervised learning, unsupervised learning, semi-supervised learning, or any other suitable training mechanism utilized in machine learning. For instance, video deconstruction engine 104 can take as input a training set of digital videos that have been labeled to enable video deconstruction engine 104 to identify where the transition points within the training set of digital videos occur. These labeled transition points could then be analyzed by deconstruction engine to gather data concerning these transition points and to develop a set of rules that can be applied by video deconstruction engine 104 in identifying transition points within a digital video that lacks the aforementioned labeling.

In some embodiments, as mentioned above, identifying transition points and partitioning of the digital video 102 is accomplished through a combination of an automated process and a manual process. In such embodiments, video deconstruction engine 104 could be configured to automatically identify possible transition points within digital video 102 and then a user could utilize a GUI, such as that mentioned above, to either confirm the possible transition points, move the possible transition points within the digital video, or delete the possible transition points. The digital video 102 could then be partitioned by the video deconstruction engine 104 based on these identified transition points. In embodiments, where video deconstruction engine 104 has been trained to identify transition points through machine learning, any changes by the user to the possible transition points identified by the video deconstruction engine 104 could be utilized by the video deconstruction engine 104 to further refine the video deconstruction engine's 104 ability to identify transition points. As used herein, to partition digital video can refer to dividing the digital video into a number of distinct parts, or segments. This is discussed in greater detail in reference to FIG. 2, below.

Once digital video 102 has been partitioned into sub-stories, the video deconstruction engine 104 can be configured to group the plurality of sub-stories into video segments 106. This grouping can be based, for example, on content contained within each sub-story of the plurality of sub-stories. As used in this context, content contained within each sub-story can refer to topics within each sub-story, characters within each sub-story, scenery within each sub-story, or any other content contained within each sub-story. Topics within each sub-story can be identified utilizing, for example: object analysis to identify an object (e.g., football, kitten, etc.), or activity (e.g., football game, eating, etc.), within the sub-story; speech/audio analysis to identify one or more topics of conversation (e.g., politics) within the sub-story; or any other mechanism for identifying topics within each sub-story. Characters within each sub-story of the digital video can be identified utilizing biometric analysis (e.g., facial recognition), or another form of similarity analysis, to identify various characters that appear within each sub-story. Scenery within each sub-story of the digital video can be identified utilizing a similarity analysis of background contained within the sub-story to identify scenes occurring within the same setting. It will be appreciated that each of the above examples are meant to be illustrative and are not meant to be limiting of the present disclosure.

In addition, video deconstruction engine 104 can be configured to infer content of a sub-story due to the location of the sub-story within the digital video. For instance, a sub-story that occurs at the beginning of a digital video could be inferred to be an introductory portion of the digital video, while a sub-story that occurs at the end of the digital video could be inferred to be a conclusion to the digital video. As an example, suppose the digital video is a marketing video (e.g., a video advertisement for a product or service), then it could be inferred that the last sub-story of the digital video is in reference to the product or service that is the subject of the marketing video. As such, this portion could be identified as a conclusion of the digital video.

The video deconstruction engine 104 can be configured to categorize each sub-story based on the above discussed content so that the sub-stories can be grouped into video segments. For instance, all of the sub-stories that include a specific character, or group of characters, could be categorized together, while all of the sub-stories that take place at a specific location could be categorized together. It will be appreciated that each sub-story could belong to only one categorization or could belong to multiple categorizations. For example, suppose a digital video includes several sub-stories with a character named John in them, all of these sub-stories could be categorized together based on the identification of the character John within the sub-story via, for example, facial recognition analysis of John. In addition, sub-stories that take place in a coffee shop, where one of those sub-stories also includes the character John could be categorized together. As such, the sub-story that includes John in the coffee shop would be included in two categories.

As mentioned above, the categorizations of the sub-stories can be utilized to group the sub-stories into video segments 106. The grouping of these sub-stories into video segments 106 can be done, automatically in accordance with various rules defined for desired groupings, manually by selecting individual sub-stories based on categorization, or in any combination of these. These rules could define any number of groupings that can take place across the categorizations which can, in turn, result in any number of video segments 106 that can include any permutations of the sub-stories of the digital video. The groupings could occur regardless of whether sub-stories occurred linearly (e.g., consecutively) within the digital video, or non-linearly (e.g., non-consecutively) within the digital video. For example, there could be a rule that indicates all sub-stories including the previously discussed character John should be grouped into a video segment along with the introduction content of the digital video and the conclusion content of the digital video. In such an example, a user wishing to only view those portions of the digital video including John could do so, within the context of the introduction and conclusion of the digital video, regardless of whether John appeared in the introduction or conclusion and regardless of whether the sub-stories appear consecutively within the digital video. As another example, suppose the digital video is a marketing video. An illustrative rule that could be associated with video segments 106 of such a marketing video could be to create video segments 106 that always include the conclusion, so that the subject product or service of the marketing video is not lost on a viewer of each individual segment. This could enable a viewer to view a much shorter marketing video centered around a subset of sub-stories that are contained within the marketing video without losing the effect of the marketing video. Such a marketing video may be more readily viewed by a viewer and could even be more impactful because the shorter duration could more easily maintain the viewer's attention.

Video deconstruction engine 104 can output the video segments 106 to navigation panel generation engine 108. Navigation panel generation engine 108 can be configured to generate one or more navigation panels 110 (e.g., navigation panels 300 and 302 of FIG. 3) that enable a user (e.g., a viewer or consumer) of the navigation panels 110 to navigate and view at least a subset of video segments 106. The one or more navigation panels 110 could be implemented utilizing any number of technologies including, for example, ADOBE® Flash (available from Adobe Systems Inc. of San Jose, Calif.) or Hypertext Markup Language 5 (HTML5).

In some embodiments, navigation panel generation engine 108 can be configured to present a GUI that enables a user of the navigation panel generation engine 108 to select a template from a number of predefined templates that can be utilized as a navigation panel. Such templates define a layout in which each of the subset of video segments can be presented to a user. These templates could be included with the navigation panel generation engine 108; purchased as an add-on from the makers of the navigation panel generation engine 108; provided, or purchased, from a third-party software vendor; provided by other users of the navigation panel generation engine 108; previously designed by the current user of navigation panel generation engine 108; or could be supplied in any other suitable manner.

If the user identifies a template from the number of predefined templates that satisfies the user's requirements, then the user can select that template to be utilized by navigation panel generation engine 108 in generating a navigation panel in accordance with the template. If the user does not identify a template from the number of predefined templates that satisfies the user's needs, the user can utilize a set of template design tools to design a custom template.

Such template design tools could take the form of a what you see is what you get (WYSIWYG) editor, a free form design tool set, or any other suitable form. These template design tools can be integrated with the navigation panel generation engine 108 or could be an add-on feature of the navigation panel generation engine 108 that is offered by the producer, or provider, of the navigation panel generation engine 108 or by a third-party software vendor.

Once a template has been selected, or designed, the navigation panel generation engine 108 can be configured to package the subset of video segments into the format of the selected template to form the navigation panel. As mentioned previously, a template can define a layout in which each of the subset of video segments can be presented to a viewer. This layout can include positions, or placeholders, that can be associated with each of the video segments of the subset of video segments. In some embodiments, this association could be user defined. Such a user defined association could be established in any number of ways. For example, this association could be established by the user dragging and dropping the respective video segment, or a representation thereof, onto a selected position within the template; by the user clicking on one of the positions within the template and then clicking on a selected video segment, or representation thereof, to associate with that position; or any other suitable mechanism. In other embodiments, this association could be automatically defined. Such an automatically defined association could be based on any number of factors. As an example, video segments with a longer running time could be automatically associated with positions, or placeholders within the template that cover a larger area of the template, thereby giving more prominence to these video segments. In other embodiments, such automatic associations could be based on demographic considerations of a potential viewer. These demographic considerations are discussed in greater detail below in reference to the targeted demographic interface depicted in FIG. 4. In still other embodiments, this association could be defined through a combination of an automatic mechanism and a user defined mechanism. For instance, this association could be initially established automatically, but then a user could manually redefine these associations, in a similar manner to that described above (e.g., drag and drop) if the user is not satisfied with the automatic association.

In embodiments, an interactive indicator (e.g., icon, thumbnail, etc.) associated with each of the subset of video segments can be displayed within the respective position, or placeholder. Such an interactive indicator could be, for example, an image, or frame, from the respective video segment. In some embodiments, such an image could be selected by a user to convey to a viewer the content contained within the respective video segment. In other embodiments, such an image could be selected automatically or by default from the video segment (e.g., the first frame of the video segment). The interactive indicator can be embedded at the position within the template that is associated with the respective video segment to include a graphical depiction of the video segment within the resulting navigation panel.

In some embodiments, the video segments themselves could be embedded in the resulting navigation panel and each video segment can be associated with the respective interactive indicator for that video segment. As such, interaction by a viewer with the respective interactive indicator of a video segment would cause the embedded video segment to begin playing. In other embodiments, links to the video segments can be embedded in the resulting navigation panel and each link to a video segment could be associated with the respective interactive indicator for that video segment. As such, interaction by a viewer (e.g., click, mouseover, touch, etc.) with the respective interactive indicator of a video segment would utilize the link associated with that interactive indicator to initiate playback of the video segment.

The resulting navigation panel can provide a viewer, or end-user, with a clear understanding of what is depicted within the individual video segments and can enable the viewer to select those video segments that are most interesting, or appealing, to the viewer. This is as opposed to having the viewer watch the entire digital video 102, which could result in the viewer losing interest or focus on the digital video, especially where digital video 102 is a marketing video, or having the viewer manually hunt through the digital video 102 looking for the portions of the digital video that are of interest to the viewer, which could result in the viewer missing any number of portions that are of interest to the viewer.

In some embodiments, navigation panel generation engine 108 can be configured to select the subset of video segments from video segments 106 or to package the subset of video segments into the selected template based on demographics considerations associated with a user, or group of users, that the navigation panel is being delivered to, or is to be delivered to. In such embodiments, navigation panel generation engine 108 can be configured with a user interface, such as targeted demographic interface 400 of FIG. 4, to enable a user of the navigation panel generation engine 108 to designate video segments and/or priorities associated with video segments to associate with a specific demographic. Such an embodiment is discussed in greater detail below in reference to FIG. 4.

In some embodiments, navigation panel generation engine 108 can be configured to embed one or more acquisition elements within the navigation panel. These acquisition elements could be selected by the user of the navigation panel generation engine 108 to acquire objects associated with the digital video. For example, if the digital video is a feature length movie, an episode of a television show, or an online marketing video, then the one or more acquisition elements may enable a viewer to download an audio file associated with the movie, television show, or online marketing video (e.g., a theme song or ring tone), or enable a viewer to download an image associated with the movie, television show, or online marketing video (e.g., electronic wallpaper). These acquisition elements could also provide a link that the viewer could utilize to purchase products associated with the movie, television show, or that are the subject of the online marketing video. It will be appreciated that these are merely examples of possible acquisition elements and should not be treated as limiting of this disclosure.

Once the navigation panels 110 have been generated by navigation panel generation engine 108, the navigation panels 110 can be output to delivery system 112. Delivery system 112 is configured to deliver the navigation panels to viewers 114. Such delivery can occur, for example, over any suitable network (e.g., the Internet). It will be appreciated that delivery system 112 could be any online delivery system capable of delivering the navigation panels 110 to viewers 114. In some embodiments, this could simply involve transmitting the navigation panel to an internet browser that is capable of displaying the navigation panel to the end-user. In some embodiments, delivery system 112 could be an online marketing system and each navigation panel could be a marketing video (e.g., advertisement) that is to be delivered to the viewer. In other embodiments, delivery system 112 could be a video sharing website (e.g., YouTube®). In some embodiments, the delivery system 112 can be configured to select a navigation panel from a plurality of navigation panels based on a demographic associated with a viewer.

Figure 5:
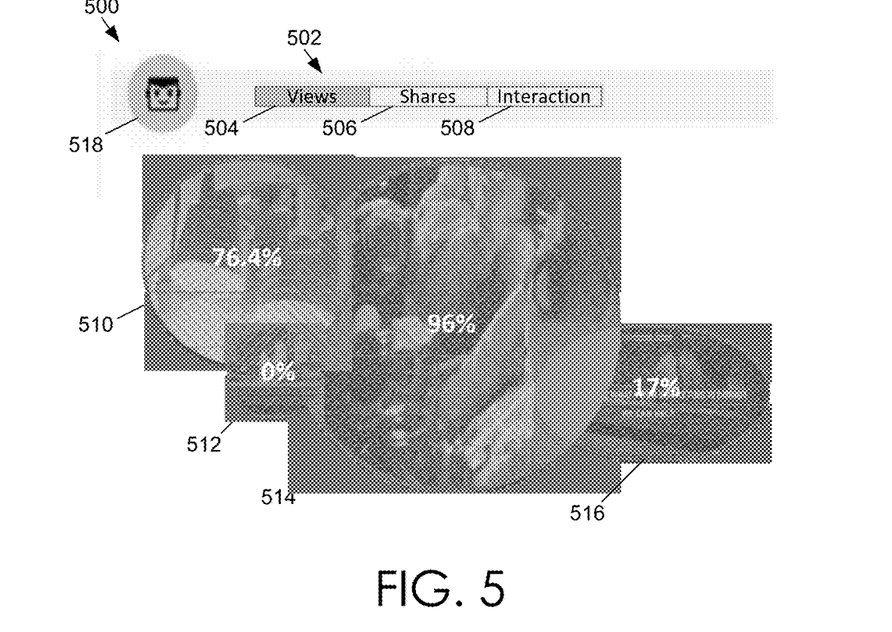
FIG. 5 provides an illustrative depiction of a video engagement interface, in accordance with various embodiments of the present disclosure.

In some embodiments, navigation panel generation engine 108 and/or delivery system 112 can be configured to enable the monitoring of actions taken by each viewer with respect to the navigation panel. For instance, in some embodiments, navigation panel generation engine 108 can configure each navigation panel to report actions taken by a viewer (e.g., video segments viewed, shared, interacted with, etc.) As an alternative or additional embodiment, delivery system 112 could be configured to monitor those resources requested by the viewer and can be configured to correlate those resources with actions taken by the viewer. For example, delivery system could receive a request for a video segment or an item associated with one of the acquisition elements and could report this information to a repository (e.g., database, cloud, etc.) where this information can be stored and analyzed. This information can provide insight into what portions of the digital video are most appealing to the viewer and can be utilized to, for example, establish trends among viewers and to adapt future digital videos to be more appealing. An illustrative user interface depicting the reporting of this information is depicted in FIG. 5.

In some embodiments, the above described processes associated with FIG. 1 could be performed entirely on the fly (e.g., at the time a navigation panel is requested). It will be appreciated that the various automated embodiments described above could enable such on-the fly generation of a navigation panel. In other embodiments, the deconstruction process, performed by deconstruction engine 104, could be performed prior to a request for a navigation panel while the navigation panel generation process, performed by navigation panel generation engine 108, could be performed on the fly. For example, where the navigation panel is a marketing communication, it may be desirable to generate the navigation panel based on demographics associated with the user that the marketing communication is being delivered to. In such an example, the navigation panel could be generated in accordance with the targeted demographics interface mentioned above and described in more detail in reference to FIG. 4, below.

Figure 2:
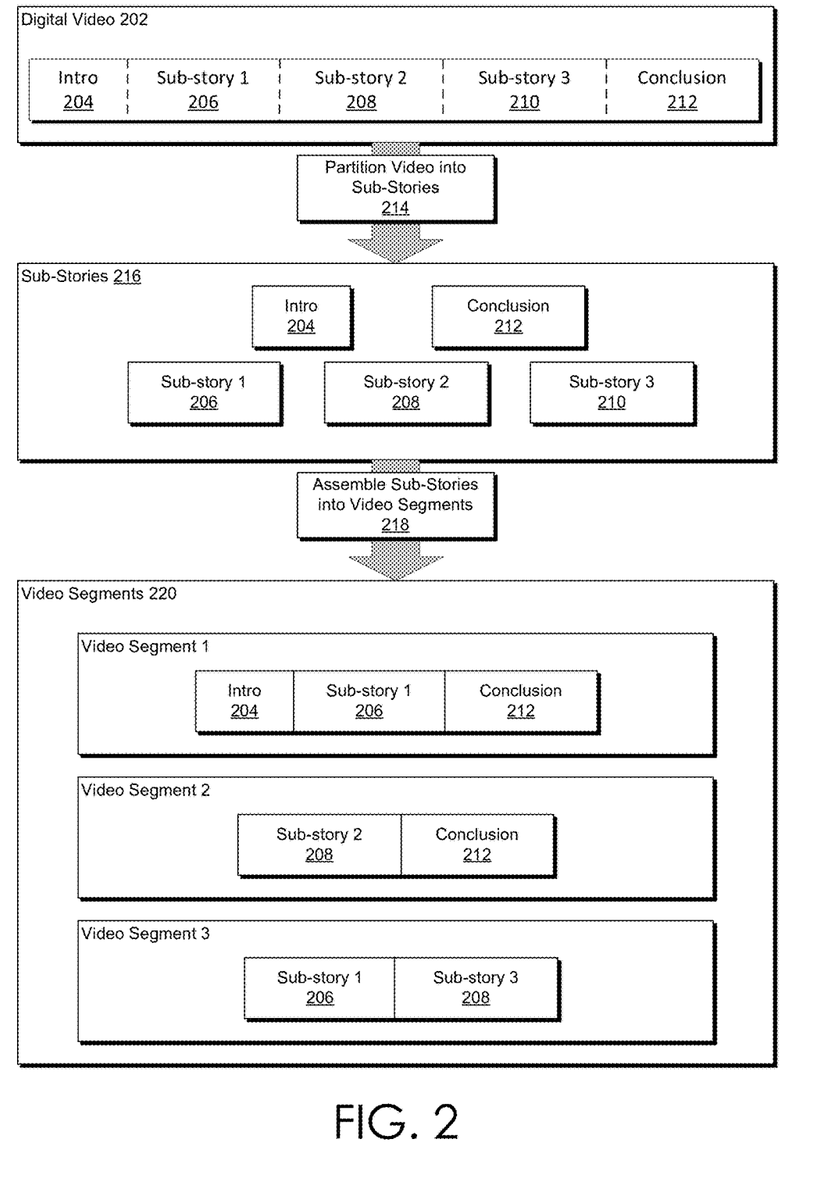
FIG. 2 provides a depiction of a video deconstruction process, in accordance with various embodiments of the present disclosure.

FIG. 2 provides a depiction of a video deconstruction process 200, in accordance with various embodiments of the present disclosure. Video deconstruction process 200 can begin by taking as input digital video 202. As depicted, digital video 202 can include multiple sub-stories (e.g., sub-stories 204-212). While sub-story 204 and 212 are labeled as intro and conclusion, respectively, it will be appreciated that these portions of digital video 202 are still considered to be sub-stories of digital video 202; however, these sub-stories have been labeled in the figure to reflect content contained within these sub-stories. As used herein, a sub-story of a digital video can refer to any portion of a digital video that has some logical delineation from another portion of the digital video. These portions can be delineated by, for example, scenes within the digital video, topics within the digital video, characters within the digital video, scenery within the digital video, or any other logical delineation. For example, a portion of a digital video that occurs within the setting of a car could be considered one sub-story, while a portion of the digital video that occurs within an office could be considered another sub-story. These delineations, or transition points, are depicted by the vertical dashed lines within digital video 202.

As depicted by block 214, in some embodiments, digital video 202 can be partitioned into these sub-stories (e.g., utilizing video deconstruction engine 104). This partitioning can be accomplished in a similar manner to that described in reference to FIG. 1, above (e.g., manual and/or automatic identification of transition points within digital video 202). This partitioning results in digital video 202 being divided into a number of distinct parts, or segments. The result of this partitioning is depicted within sub-stories 216.

Once digital video 202 has been partitioned into sub-stories 216, the individual sub-stories can be assembled, or grouped, into a plurality of video segments as depicted by block 218. As discussed in reference to FIG. 1, this grouping can be based, for example, on content contained within each sub-story of the plurality of sub-stories. As used in this context, content contained within each sub-story can refer to topics within each sub-story, characters within each sub-story, scenery within each sub-story, or any other content contained within each sub-story. Topics within each sub-story can be identified utilizing, for example: object analysis to identify an object (e.g., football, rocket, etc.), or activity (e.g., football game, eating, etc.), within the sub-story; speech/audio analysis to identify one or more topics of conversation (e.g., politics) within the sub-story; or any other mechanism for identifying topics within each sub-story. Characters within each sub-story of the digital video can be identified utilizing biometric analysis (e.g., facial recognition), or another form of similarity analysis, to identify various characters that appear within each sub-story. Scenery within each sub-story of the digital video can be identified utilizing a similarity analysis of background contained within the sub-story to identify scenes occurring within the same setting. It will be appreciated that each of the above examples are meant to be illustrative and are not meant to be limiting of the present disclosure.

In addition, content of a sub-story can be inferred due to the location of the sub-story within the digital video. For instance, and as discussed in reference to FIG. 1, above, a sub-story that occurs at the beginning of a digital video (e.g., intro 204) could be inferred to be an introductory portion of the digital video, while a sub-story that occurs at the end of the digital video (e.g., conclusion 212) could be considered a conclusion to the digital video. In some embodiments, each sub-story could be categorized based on this content, for instance, all of the sub-stories that include a specific character, or group of characters, could be categorized together, while all of the sub-stories that take place at a specific location could be categorized together. It will be appreciated that each sub-story could belong to only one categorization or could belong to multiple categorizations. For example, suppose a digital video includes several sub-stories with a character named John in them, all of these sub-stories could be categorized together based on the identification of the character John within the sub-story via, for example, facial recognition analysis of John. In addition, sub-stories that take place in a coffee shop, where one of those sub-stories also includes the character John could be categorized together. As such, the sub-story that includes John in the coffee shop would be included in two categories.

The categorizations of the sub-stories can be utilized to group the sub-stories into video segments 220 that includes each of video segments 1-3. The grouping of these sub-stories into video segments 220 can be done, automatically in accordance with various rules defined for desired groupings, manually by selecting individual sub-stories based on categorization, or in any combination of these. These rules could define any number of groupings that can take place across the categorizations which can, in turn, result in any number of video segments that can include any permutations of the sub-stories of the digital video. As depicted, the groupings could occur regardless of whether sub-stories occurred linearly (e.g., consecutively) within the digital video, or non-linearly (e.g., non-consecutively) within the digital video.

Figure 3:
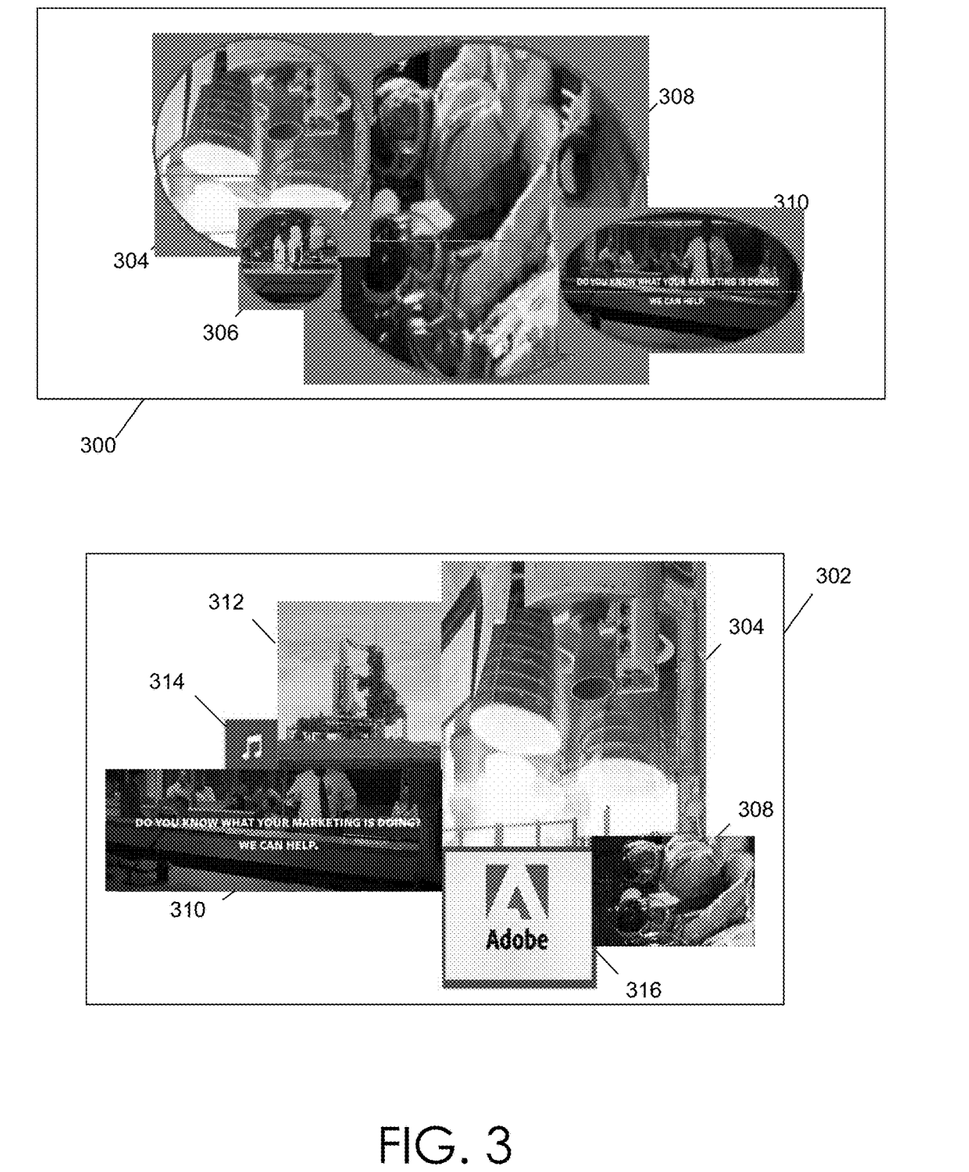
FIG. 3 provides examples of illustrative navigation panels, in accordance with various embodiments of the present disclosure.

FIG. 3 provides examples of illustrative navigation panels 300 and 302, in accordance with various embodiments of the present disclosure. Navigation panels 300 and 302 could be implemented utilizing any number of technologies including, for example, ADOBE® Flash or HTML5. In addition, navigation panels 300 and 302 can be based on a reusable template, such as that discussed above in reference to FIG. 1, that defines a layout in which each of the subset of video segments are presented to a viewer (e.g., video segments represented by interactive indicators 304, 306, 308, and 310 of navigation panel 300 and video segments represented by interactive indicators 304, 308, 310, and 312 of navigation panel 302). Because navigation panels 300 and 302 present some of the same video segments (e.g., 304, 306, 308, and 310), some of the reference numbering is shared between navigation panel 300 and navigation panel 302. Where the same reference number is utilized in both navigation panel 300 and navigation panel 302, this is to accentuate the different layouts for the same video segments.

Each of the positions depicted within navigation panels 300 and 302 represent what would have been a placeholder within the respective template that was utilized to generate these navigation panels. As can be seen, each of the positions within navigation panel 300 has been associated with a respective video segment represented by interactive indicators 304, 306, 308, and 310. In addition, various positions within navigation panel 302 have been associated with a respective video segment represented by interactive indicators 304, 308, 310, and 312. As depicted, each interactive indicator represents an image, or frame, from the respective video segment. In some embodiments, such an image could be selected by a user to convey to a viewer the content contained within the respective video segment. In other embodiments, such an image could be selected automatically or by default from the video segment (e.g., the first frame of the video segment). As can be seen, the interactive indicators 304, 306, 308, and 310 are embedded at the position within the template that is associated with the respective video segment and include a graphical depiction of the video segment within navigation panel 300. As such, navigation panels 300 and 302 provide a viewer, or end-user, with a clear understanding of the content of the individual video segments and can enable the viewer to select those video segments that are most interesting to the viewer. Once one of the interactive indicators is selected, the associated video segment can begin playing for the viewer.

As mentioned previously, in some embodiments, one or more acquisition elements can be embedded within a navigation panel. These acquisition elements can be configured to enable a viewer to acquire various objects associated with the digital video that is depicted within the individual video segments. Example acquisition elements are depicted by acquisition elements 314 and 316 of navigation panel 302. Acquisition element 314 depicts an acquisition element that enables a viewer to download an audio file associated with the digital video depicted within navigation panel 302 (e.g., a theme song or ring tone). Acquisition element 316, on the other hand, depicts an acquisition element that enables a viewer to navigate to an ADOBE® website, or a reseller associated therewith, in order to purchase products or services associated with the digital video depicted within navigation panel 302. It will be appreciated that these are merely examples of possible acquisition elements and should not be treated as limiting of this disclosure.

Figure 4:
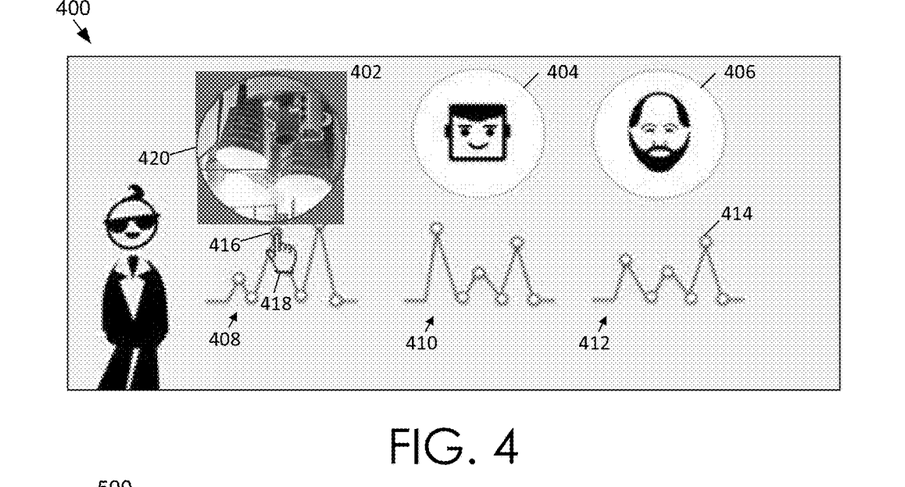
FIG. 4 provides an illustrative targeted demographic interface, in accordance with various embodiments of the present disclosure.

FIG. 4 provides an illustrative targeted demographic interface 400, in accordance with various embodiments of the present disclosure. Target demographic interface 400 could be, for example, integrated as part of navigation panel generation engine 108 of FIG. 1. As depicted, target demographic interface 400 depicts three different demographic segments. The first demographic segment is represented by demographic indicator 402, which, although mostly obscured in the depiction, represents a child demographic. The second demographic segment is represented by demographic indicator 404, which represents an adolescent male demographic. The third demographic segment is represented by demographic indicator 406, which represents an older male demographic. It will be appreciated that these demographics are merely meant to be illustrative of possible demographics and should not be treated as limiting of the present disclosure. Any demographic is expressly contemplated by this disclosure.

Each of demographic indicators 402-406 are respectively associated with a grouping of video segments represented by interactive elements 408-412. Each of the dots (e.g., dots 414 and 416) depicted along interactive elements 408-412 represent an individual video segment. The higher the respective dot is placed along the interactive elements 408-412, is indicative of a higher weight, or priority, for that video segment with respect to the associated demographic. As an example, a user is utilizing cursor 418 to adjust the priority for the video segment associated with video segment indicator 420, which could also coincide with the interactive indicators, or the images associated therewith, discussed above. As can be seen, in some embodiments, a mouse-over, or selection, of one of the dots can cause a video segment indicator to appear to enable a user to of the targeted demographic interface 400 to more easily identify the associated video segment. It will be appreciated that this is merely illustrative and any suitable mechanism could be utilized to convey this information to a user (e.g., each dot could be an image).

These priorities can be utilized in any number of ways. For instance, video segments could be associated with positions within the navigation panel whose area correlates with the priority assigned to the respective video segment. For example, a video segment with a higher priority for a demographic could be assigned a larger position within the navigation panel than a video segment with a lower priority. In addition, the priorities could be utilized to determine what video segments to include in a navigation panel associated with a respective demographic where the navigation panel, or the template being utilized to generate the navigation panel, does not have sufficient positions for all of the video segments. It will be appreciated that navigation panel generation engine 108 of FIG. 1 can be configured to take these priorities into account when generating the navigation panels. In addition, it will be appreciated that, where multiple demographics are associated with a digital video, that navigation panel generation engine 108 of FIG. 1 could be configured to generate a navigation panel for each demographic, which could then be selected at time of delivery based on a demographic associated with a user.

This targeted demographic interface could be beneficial for any instances where a user is trying to address different populations in different ways. For example, a movie that includes both action and romance could have video segments containing the action scenes associated with a first demographic in which the action scenes are assigned a higher priority and the video segments containing the romantic scenes associated with a second demographic in which the romantic scene are assigned a higher priority. This would enable each of the first and second demographics to have a different experience when utilizing a navigation panel associated with the movie. This could also be beneficial where the associated digital video is a marketing video. In such an instance a single marketing video could be divided into video segments with video segments targeted to different demographics. As such, a viewer of a single demographic could choose to view only those video segments targeted towards that viewer rather than trudging through those video segments designed to appeal to a different demographic. This could make the marketing video more impactful for each viewer of the demographic, while also encouraging the watching of the marketing video by shortening what the viewer is exposed to.

FIG. 5 provides an illustrative depiction of a video engagement interface 500, in accordance with various embodiments of the present disclosure. Video engagement interface 500 could be integrated with navigation panel generation engine 108 of FIG. 1 and could be presented to users of the navigation panel generation engine 108 of FIG. 1 to evaluate the effectiveness of a navigation panel. To accomplish this, video engagement interface 500 can display metrics gathered through the monitoring of viewers actions with respect to a navigation panel. As depicted, video engagement interface 500 includes a metric selection area 502. The metric selection area 502 can enable a user to transition between viewing metrics related to views 504, shares 506, interactions 508, or any other metrics that are not depicted. As depicted by the darker gray shading, the video engagement interface is currently displaying metrics related views 504. As such, a user can quickly identify what video segments contained within the depicted navigation panel are generating more interest. As can be seen, 76.4% of viewers viewed the video segment associated with position 510, 96% of viewers viewed the video segment associated with position 514, only 17% viewed the video segment associated with position 516, and no one viewed the video segment associated with position 512. The user that created the navigation panel can utilize this information to adjust those video segments being displayed within the associated navigation panel. For example, in this instance, the user could view position 516 and 512 as underperforming and could replace either the image depicted in these positions to a more appealing image or completely change out the associated video segments. In addition, as indicated by demographic indicator 518, the depicted metrics are associated with an adolescent male demographic.

Figure 6:
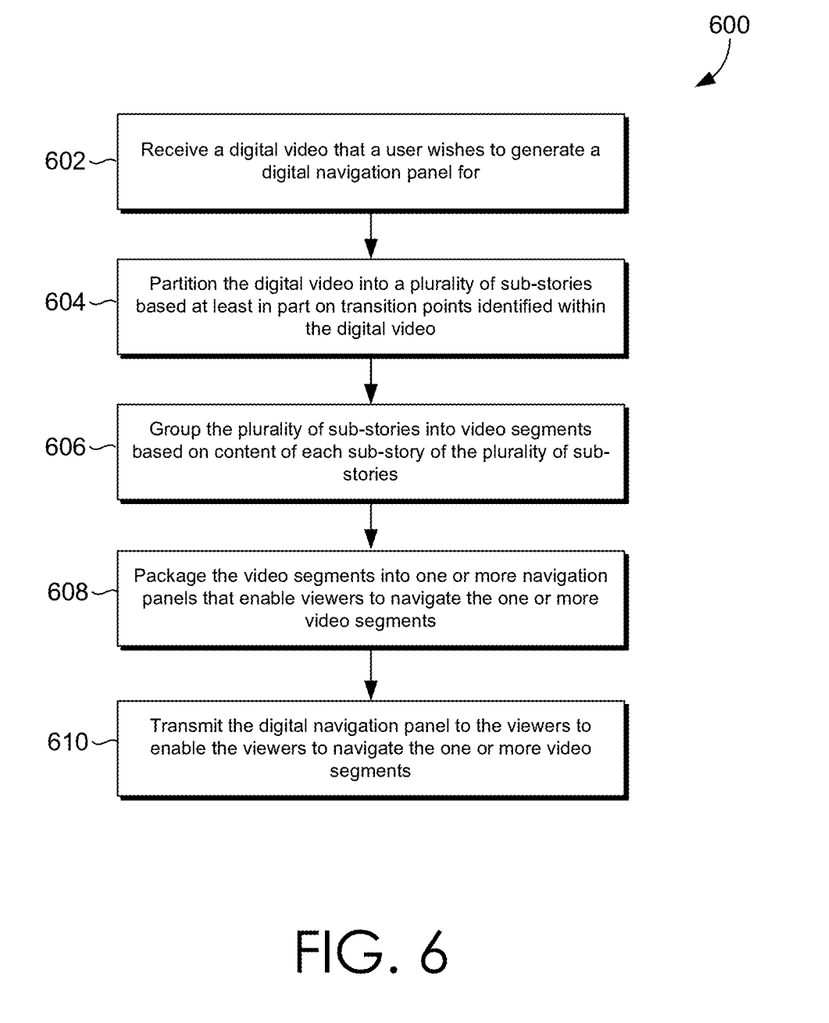
FIG. 6 depicts an illustrative process flow depicting a method of processing a video file, in accordance with various embodiments of the present disclosure.

FIG. 6 depicts an illustrative process flow 600 depicting a method of processing a video file, in accordance with various embodiment of the present disclosure. Process flow 600 could be carried out, for example by video processing system 100 of FIG. 1. As depicted, process flow 600 can begin at block 602 where a digital video is received as input. This digital video can include multiple sub-stories that can be delineated by, for example, scenes within the digital video, topics within the digital video, characters within the digital video, scenery within the digital video, or any other logical delineation. For example, a portion of a digital video that occurs within the setting of a car could be considered one sub-story, while a portion of the digital video that occurs within an office could be considered another sub-story. As an additional example, and as depicted within FIG. 3, a portion of a digital video that includes a grouping of astronauts could be one sub-story, while a portion of a digital video that includes a rocket launch could be considered another sub-story.

At block 604 the digital video received at block 602 can be partitioned into individual sub-stories. To accomplish this partitioning, transition points within the digital video that are indicative of a transition from one sub-story to another can be identified within the digital video. This identification of transition points and partitioning of the digital video could be accomplished manually by a user, automatically (e.g., by video deconstruction engine 104 of FIG. 1), or any combination thereof.

In embodiments, where a user manually identifies the transition points within the digital video, a graphical user interface (GUI) can be presented to the user to enable the user to identify the transition points that the user wishes to utilize as delineations between sub-stories contained within the digital video. This could be accomplished, for example, by the user identifying a location, or time, within the digital video that the user wishes to identify as a transition point. The digital video could then be partitioned based on these user identified transition points. In embodiments, where the partitioning is accomplished automatically, the machine learning discussed above in reference to FIG. 1 could be utilized to accomplish the identification of these transition points and partitioning of the digital video based on these transitions points. In some embodiments, as mentioned previously, identifying transition points and partitioning of the digital video could be accomplished through a combination of an automated process and a manual process. In such embodiments, possible transition points can be initially identified automatically, through the process described above. A user could then confirm the possible transition points, move the possible transition points within the digital video, or delete the possible transition points. The digital video could then be partitioned based on these identified transition points.

Once the digital video has been partitioned into a plurality of sub-stories, the plurality of sub-stories can be grouped into video segments at block 606. This grouping can be based, for example, on content contained within each sub-story of the plurality of sub-stories. As used in this context, content contained within each sub-story can refer to topics within each sub-story, characters within each sub-story, scenery within each sub-story, or any other content contained within each sub-story. Topics within each sub-story can be identified utilizing, for example: object analysis to identify an object (e.g., football, rocket, etc.), or activity (e.g., football game, eating, etc.), within the sub-story; speech/audio analysis to identify one or more topics of conversation (e.g., politics) within the sub-story; or any other mechanism for identifying topics within each sub-story. Characters within each sub-story of the digital video can be identified utilizing biometric analysis (e.g., facial recognition), or another form of similarity analysis, to identify various characters that appear within each sub-story. Scenery within each sub-story of the digital video can be identified utilizing a similarity analysis of background contained within the sub-story to identify scenes occurring within the same setting. It will be appreciated that each of the above examples are meant to be illustrative and are not meant to be limiting of the present disclosure.

In addition, content of a sub-story can be inferred based the location of the sub-story within the digital video. For instance, a sub-story that occurs at the beginning of a digital video could be inferred to be an introductory portion of the digital video, while a sub-story that occurs at the end of the digital video could be considered a conclusion to the digital video. As an example, suppose the digital video is a marketing video (e.g., a video advertisement for a product or service), then it could be inferred that the last sub-story of the digital video is in reference to the product or service that is the subject of the marketing video. As such, this portion could be identified as a conclusion of the digital video.

Each sub-story could then be categorized based on the above discussed content. For instance, all of the sub-stories that include a specific character, or group of characters, could be categorized together, while all of the sub-stories that take place at a specific location could be categorized together. It will be appreciated that each sub-story could belong to only one categorization or could belong to multiple categorizations. For example, suppose a digital video includes several sub-stories with a character named John in them, all of these sub-stories could be categorized together based on the identification of the character John within the sub-story via, for example, facial recognition analysis of John. In addition, sub-stories that take place in a coffee shop, where one of those sub-stories also includes the character John could be categorized together. As such, the sub-story that includes John in the coffee shop would be included in two categories.

The categorizations of the sub-stories can be utilized to group the sub-stories into video segments. The grouping of these sub-stories into video segments can be done, automatically in accordance with various rules defined for desired groupings, manually by selecting individual sub-stories based on categorization, or in any combination of these. These rules could define any number of groupings that can take place across the categorizations which can, in turn, result in any number of video segments that can include any permutations of the sub-stories of the digital video. The groupings could occur regardless of whether sub-stories occurred linearly (e.g., consecutively) within the digital video, or non-linearly (e.g., non-consecutively) within the digital video. For example, there could be a rule that indicates all sub-stories including the previously discussed character John should be grouped into a video segment along with the introduction content of the digital video and the conclusion content of the digital video. In such an example, a user wishing to only view those portions of the digital video including John could do so, within the context of the introduction and conclusion of the digital video, regardless of whether John appeared in the introduction or conclusion and regardless of whether the sub-stories appear consecutively within the digital video. As another example, suppose the digital video is a marketing video. An illustrative rule that could be associated with video segments of such a marketing video could be to create video segments that always include the conclusion, so that the subject product or service of the marketing video is not lost on a viewer of each individual segment. This could enable a viewer to view a much shorter marketing video centered around a subset of sub-stories contained within the marketing video without losing the effect of the marketing video. Such a marketing video may be more readily viewed by a viewer and could even be more impactful because the shorter duration could more easily maintain the viewer's attention.

At block 608, the video segments can be packaged into one or more navigation panels that enable a viewer of the navigation panel to navigate and view at least a subset of video segments. The one or more navigation panels could be implemented utilizing any number of technologies including, for example, ADOBE® Flash or HTML5. In some embodiments, the navigation panel can be based on a user selected, or designed template, such as that discussed above in reference to FIG. 1. Once a template has been selected, or designed, the subset of video segments can be packaged into the format of the selected template to form the navigation panel. As mentioned previously, a template can define a layout in which each of the subset of video segments can be presented to a viewer. This layout can include positions, or placeholders, that can be associated with each of the video segments of the subset of video segments. In some embodiments, this association could be user defined. Such a user defined association could be established in any number of ways. For example, this association could be established by the user dragging and dropping the respective video segment, or a representation thereof, onto a selected position within the template; by the user clicking on one of the positions within the template and then clicking on a selected video segment, or representation thereof, to associate with that position; or any other suitable mechanism. In other embodiments this association could be automatically defined. Such an automatically defined association could be based on any number of factors. As an example, video segments with a longer running time could be automatically associated with positions, or placeholders within the template that cover a larger area of the template. In other embodiments, such automatic associations could be based on demographic considerations of a potential viewer. These demographic considerations are discussed in greater detail above in reference to the targeted demographic interface depicted in FIG. 4. In still other embodiments, this association could be defined through a combination of an automatic mechanism and a user defined mechanism. For instance, this association could be initially established automatically, but then a user could manually redefine these associations, in a similar manner to that described above (e.g., drag and drop) if the user is not satisfied with the automatic association.

In embodiments, an interactive indicator (e.g., icon, thumbnail, etc.) associated with each of the subset of video segments can be displayed within the respective position, or placeholder. Such an interactive indicator could be, for example, an image, or frame, from the respective video segment. In some embodiments, such an image could be selected by a user to convey to a viewer the content contained within the respective video segment. In other embodiments, such an image could be selected automatically or by default from the video segment (e.g., the first frame of the video segment). The interactive indicator can be embedded at the position within the template that is associated with the respective video segment to include a graphical depiction of the video segment within the resulting navigation panel.

In some embodiments, the video segments themselves could be embedded in the resulting navigation panel and each video segment could be associated with the respective interactive indicator for that video segment. As such, interaction by a viewer with the respective interactive indicator of a video segment would cause the embedded video segment to be playing. In other embodiments, links to the video segments could be embedded in the resulting navigation panel and each link to a video segment could be associated with the respective interactive indicator for that video segment. As such, interaction by a viewer (e.g., click, mouseover, touch, etc.) with the respective interactive indicator of a video segment would utilize the link associated with that interactive indicator to initiate playback of the video segment.

The resulting navigation panel can provide a viewer with a clear understanding of what is depicted within the individual video segments and can enable the viewer to select those video segments that are most interesting to the viewer. This is as opposed to having the viewer watch the entire digital video, which could result in the viewer losing interest or focus on the digital video, especially where digital video is a marketing video, or having the viewer manually hunt through the digital video looking for the portions of the digital video that are of interest to the viewer, which could result in the viewer missing any number of portions that are of interest to the viewer.

In some embodiments, the subset of video segments can be automatically selected from the video segments or the subset of video segments can be packaged into the selected template based on demographics considerations associated with a user, or group of users, that the navigation panel is being delivered to, or is to be delivered to. Such a user interface is depicted by targeted demographic interface 400 of FIG. 4.

In some embodiments, one or more acquisition elements can be embedded within the navigation panel. These acquisition elements could be selected by the user generating the navigation panel. For example, if the digital video is a feature length movie, an episode of a television show, or an online marketing video, then the one or more acquisition elements may selected to enable a viewer to download an audio file associated with the movie, television show, or online marketing video (e.g., a theme song or ring tone), or enable a viewer to download an image associated with the movie, television show, or online marketing video (e.g., electronic wallpaper). These acquisition elements could also provide a link that the viewer could utilize to purchase products associated with the movie, television show, or that are the subject of the online marketing communication. It will be appreciated that these are merely examples of possible acquisition elements and should not be treated as limiting of this disclosure.

Once the navigation panels have been generated, at block 610 the one or more navigation panels can be delivered to viewers to enable the viewers to navigate the one or more video segments utilizing the one or more navigation panels.

Figure 7:
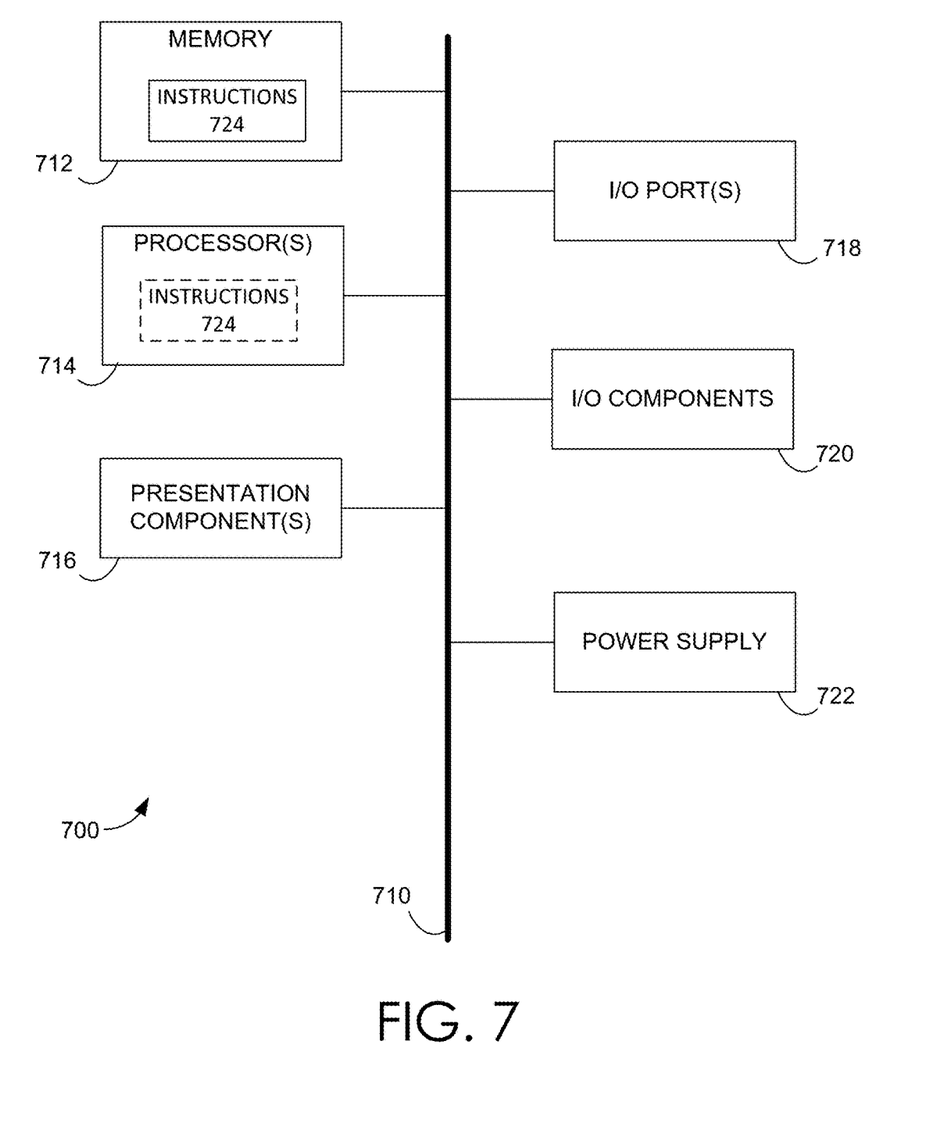
FIG. 7 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 7, an illustrative operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 7, computing device 700 includes a bus 710 that directly or indirectly couples the following devices: memory 712, one or more processors 714, one or more presentation components 716, input/output ports 718, input/output components 720, and an illustrative power supply 722. Bus 710 represents what may be one or more busses (such as an address bus, data bus, or combination thereof). Although the various blocks of FIG. 7 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 7 is merely illustrative of an example computing device that can be used in connection with one or more embodiments of the present disclosure. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 700 includes one or more processors that read data from various entities such as memory 712 or I/O components 720. Presentation component(s) 716 present data indications to a user or other device. Illustrative presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method for deconstructing digital videos comprising:

training an engine to develop a set of video deconstruction rules via a supervised machine-learning analysis that receives a set of input training videos that includes a plurality of labeled transition points, wherein the set of video deconstruction rules are developed by employing the supervised machine-learning analysis to train the engine, based on the input set of training videos and the plurality of labeled transition points, to automatically identify where the plurality of labeled transition points are within the set of input training videos;

automatically identifying a plurality of transition points within a digital video, which is separate from the set of training videos, based on the set of video deconstruction rules developed via the supervised machine-learning process, wherein each of the plurality of automatically identified transition points indicates a transition from one sub-story to another sub-story of a plurality of sub-stories of the digital video;

partitioning the digital video into the plurality of sub-stories based at least in part on the plurality of automatically identified transition points within the digital video;

grouping the plurality of sub-stories into video segments based on content of each sub-story of the plurality of sub-stories;

adding to each of the video segments at least one of an introduction and a conclusion regardless of the content of the introduction and the conclusion, wherein the introduction is a first sub-story that occurs at a beginning of the digital video and the conclusion is a last sub-story that occurs at an end of the digital video;

presenting a graphical user interface that enables a template to be selected from a plurality of templates that are to be utilized to define a layout of the video segments in a navigation panel; and packaging the video segments into the navigation panel based on the selected template, wherein the navigation panel presents the video segments to a viewer in an interactive graphical manner that enables the viewer to navigate the one or more video segments.

2. The computer-implemented method of claim 1, wherein packaging the video segments into the navigation panel further comprises:

embedding one or more acquisition elements within the navigation panel, wherein the one or more acquisition elements enable the viewer to:

download an audio file associated with the digital video;
download an image associated with the digital video; or
purchase a product or service associated with the digital video.

3. The computer-implemented method of claim 1, further comprising:

automatically grouping the plurality of sub-stories into video segments further based on another set of rules that define groupings based on a categorization of the content of each sub-story of the plurality of sub-stories.

4. The computer-implemented method of claim 1, further comprising:
presenting a graphical user interface that enables the viewer to provide manual updates for the automatically identified transition points within the digital video; and
refining the set of video deconstruction rules based on the manual updates for the automatically identified transition points within the digital video.

5. The computer-implemented method of claim 1, wherein grouping the plurality of sub-stories into video segments is based further on a location of the sub-story within the digital video.

6. The computer-implemented method of claim 1, further comprising:
transmitting the navigation panel to the viewer to enable the viewer to navigate the video segments utilizing the navigation panel;
monitoring the viewer's navigation of the video segments to identify those video segments that are of interest to the viewer.

7. The computer-implemented method of claim 6, further comprising:
utilizing the identified video segments that are of interest to the viewer and additional identified video segments that are of interest to one or more other viewers to generate engagement metrics associated with the navigation panel; and
presenting, via a video engagement interface, the engagement metrics to enable analysis of the effectiveness of the navigation panel.

8. The computer-implemented method of claim 1, wherein at least one of the video segments includes two sub-stories that are grouped consecutively within the video segment that are not consecutive within the digital video.

9. The computer-implemented method of claim 1, further comprising:
displaying a targeted demographic interface that enables selection of priorities associated with a demographic with respect to the video segments of the digital video, wherein packaging the video segments into the navigation panel is based on the priorities.

10. The computer-implemented method of claim 1, further comprising:
wherein the digital video is a marketing video to inform the viewer of products or services available to the viewer.

11. One or more non-transitory computer-readable media having a plurality of executable instructions embodied thereon, which, when executed by a processor of a computing device cause the computing device to:
training an engine to develop a set of video deconstruction rules via a supervised machine-learning analysis that receives a set of input training videos that includes a plurality of labeled transition points, wherein the set of video deconstruction rules are developed by employing the supervised machine-learning analysis to train the engine, based on the input set of training videos and the plurality of labeled transition points, to automatically identify where the plurality of labeled transition points are within the set of input training videos;
display a navigation panel to a viewer that presents a plurality of video segments to the viewer that are automatically generated by grouping one or more sub-stories of a plurality of sub-stories included in a digital video based on the set of video deconstruction rules developed via the supervised machine-learning process and identifying objects visually depicted in the digital video such that each of the plurality of video segments includes one or more of the plurality of sub-stories and wherein at least one of the plurality of video segments includes two sub-stories from the digital video that are grouped consecutively within the video segment and are non-consecutive within the digital video, wherein each of the plurality of video segments are include at least one of an introduction and a conclusion regardless of whether content of the introduction and the conclusion relates to the content of the grouped one or more sub-stories of the plurality of sub-stories that comprise each of the plurality of video segments, wherein the introduction is a first sub-story that occurs at a beginning of the digital video and the conclusion is a last sub-story that occurs at an end of the digital video; and
in response to receiving a selection of a video segment via the navigation panel, initiate playback of the selected video segment.

12. The one or more computer-readable media of claim 11, wherein the navigation panel includes one or more elements that enable the viewer to initiate:
a download of an audio file associated with the digital video;
a download of an image associated with the digital video; or
a purchase of a product or service associated with the digital video.

13. The one or more computer-readable media of claim 11, wherein, in response to receiving the selection of the selected video segment via the navigation panel, the plurality of executable instructions are further to cause the computing device to report an identifier of the selected video segment to a repository to enable monitoring of the viewer's interaction with the navigation panel.

14. The one or more computer-readable media of claim 11, wherein the plurality of video segments that are presented to the viewer by the navigation panel are based on a demographic associated with the viewer.

15. The one or more computer-readable media of claim 11, wherein the navigation panel presents the plurality of video segments to the viewer in an interactive graphical manner that enables the viewer to navigate the plurality of video segments.

16. The one or more computer-readable media of claim 11, wherein the digital video is a marketing video to inform the viewer of products or services available to the user.

17. A computing device for deconstructing digital videos comprising:
one or more processors; and
memory, coupled with the one or more processors, having executable instructions embodied thereon, which, when executed by the one or more processors cause the computing device to:
training an engine to develop a set of video deconstruction rules via a supervised machine-learning analysis that receives a set of input training videos that includes a plurality of labeled transition points, wherein the set of video deconstruction rules are developed by employing the supervised machine-learning analysis to train the engine, based on the input set of training videos and the plurality of labeled transition points, to automatically identify where the plurality of labeled transition points are within the set of input training videos;

automatically identify transition points within a digital video in accordance with the set of rules developed via the supervised machine-learning process;

partition the digital video into a plurality of sub-stories based at least in part on the automatically identified transition points within the digital video, wherein each transition point indicates a transition from one sub-story of the plurality of sub-stories to another sub-story of the plurality of sub-stories;

group the plurality of sub-stories into video segments based on content of each sub-story of the plurality of sub-stories such that each of the video segments includes at least a portion of the digital video, wherein at least one of the video segments includes two sub-stories that are grouped consecutively within the video segment that are non-consecutive within the digital video;

adding to each of the video segments at least one of an introduction and a conclusion regardless of the content of the introduction and the conclusion, wherein the introduction is a first sub-story that occurs at a beginning of the digital video and the conclusion is a last sub-story that occurs at an end of the digital video;

package the video segments into a navigation panel that includes an interactive indicator for each of the video segments, wherein each interactive indicator includes a graphical depiction of the particular portion of the digital video that is included in the corresponding video segment; and display the navigation panel for a viewer, such that the graphical depiction of each interactive indicator is presented to the viewer and each of the interactive indicators enables the viewer to select and view the particular portion of the digital video that is included in the corresponding video segment.

18. The computing device of claim 17, wherein the executable instructions that, when executed by the one or more processors, cause the computing device to package the video segments into the navigation panel further cause the computing device to:

embed one or more elements within the navigation panel, wherein the one or more elements enable the viewer to perform one or more of:

downloading of an audio file associated with the digital video;

downloading of an image associated with the digital video; and purchasing a product or service associated with the digital video.

19. The computing device of claim 17, wherein the executable instructions, when executed by the one or more processors, further cause the computing device to:

present a graphical user interface that enables manual identification of one or more of the transition points within the digital video.

20. The computing device of claim 17, wherein the executable instructions, when executed by the one or more processors, further cause the computing device to:

transmit the navigation panel to the viewer to enable the viewer to navigate the video segments utilizing the navigation panel; and monitor the viewer's navigation of the video segments to identify those video segments that are of interest to the viewer.

* * * * *